(No Model.) 3 Sheets—Sheet 1.

A. PFUND.
MOWER.

No. 557,317. Patented Mar. 31, 1896.

Witnesses
H. C. Rahn
F. H. Smith

Inventor
Adolph Pfund
Henry F. Noyes
By his Attorney (No Model.)  3 Sheets—Sheet 2.

A. PFUND.
MOWER.

No. 557,317.  Patented Mar. 31, 1896.

Witnesses
F. H. Smith
H. C. Rahn

Inventor
Adolph Pfund
By his Attorney
Henry F. Noyes (No Model.)  
3 Sheets—Sheet 3.

A. PFUND.
MOWER.

No. 557,317. Patented Mar. 31, 1896.

Witnesses  
Geo. M. Barter  
Seaman H. Carter

Inventor  
Adolph Pfund  
By his Attorney  
Henry F. Noyes

UNITED STATES PATENT OFFICE.

ADOLPH PFUND, OF GENOA, ILLINOIS.

MOWER.

SPECIFICATION forming part of Letters Patent No. 557,317, dated March 31, 1896.

Application filed June 6, 1895. Serial No. 551,891. (No model.)

*To all whom it may concern:*

Be it known that I, ADOLPH PFUND, of Genoa, county of De Kalb, and State of Illinois, have invented certain new and useful Improvements in Mowers, of which the following is a specification.

The object of my invention is to provide an efficient and economical mower, and one that will overcome certain radical defects existing in those at present in use, and the points especially aimed at in my invention are as follows: It is well known that while the cutter-bars heretofore invented have been strong enough to stand any horizontal strains they are very liable to spring vertically, causing the sickle and guard to bind in some places and to spread or gap in other places, thus injuring the cutting capacity of the mower and increasing the friction and lending opportunity for fine grass to clog the cutting parts. This weakness I remedy by making the cutting-blade and guard-plate of angular cross-section. In cutting some materials it is desirable that the blade should be thinner than in other cases. To provide a means of accomplishing this I make my guard-plate of two parts, so that by horizontal adjustment either the whole thickness of the two parts may be made use of or only the thickness of one part, and the sickle-blade I construct in the same manner. Again, it is often desirable to adjust the cutting-blade and guard-plate a slight distance apart, especially where heavy or thick material is to be cut. Another point in which I aim to make an improvement is the friction of the cutting-blade, and this I accomplish by carrying it on roller-bearings. The mechanism I have invented to accomplish these features is fully shown in the accompanying drawings.

Figure 1:
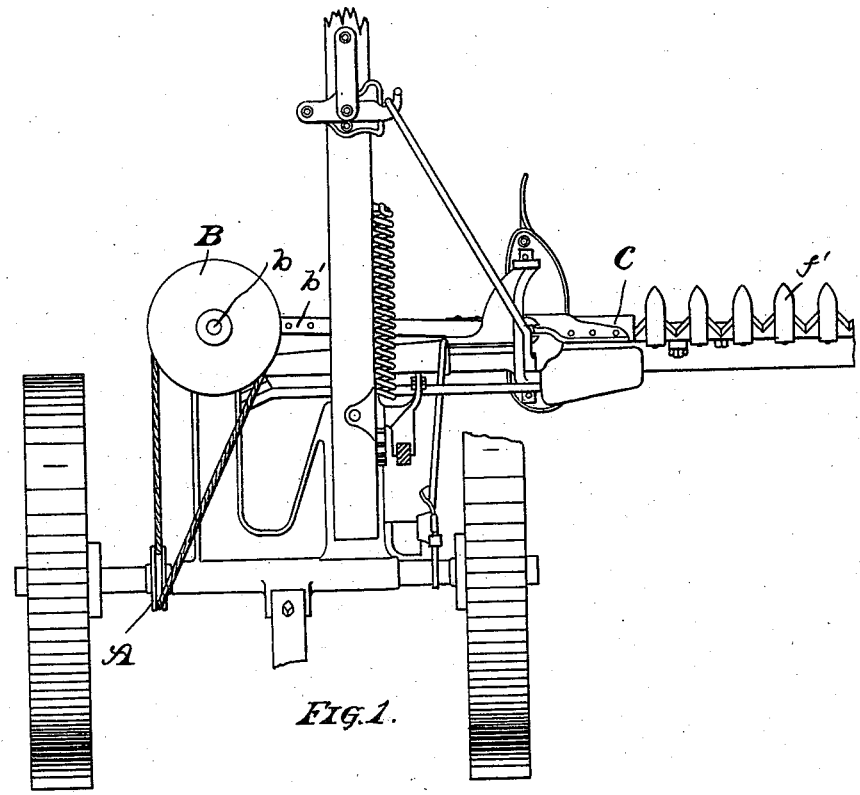
Figures 2, 3:
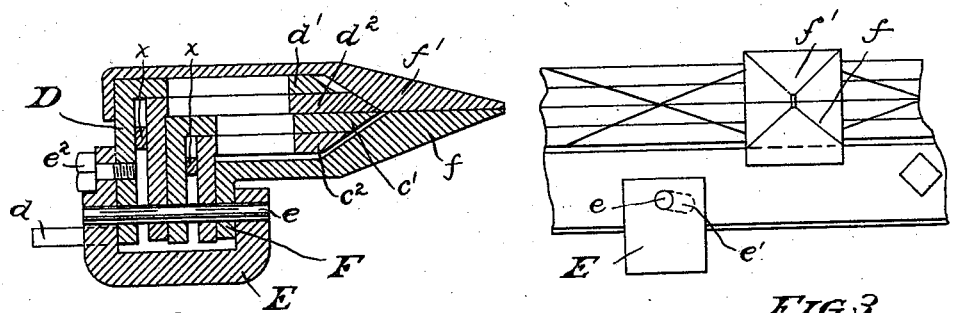
Figure 4:
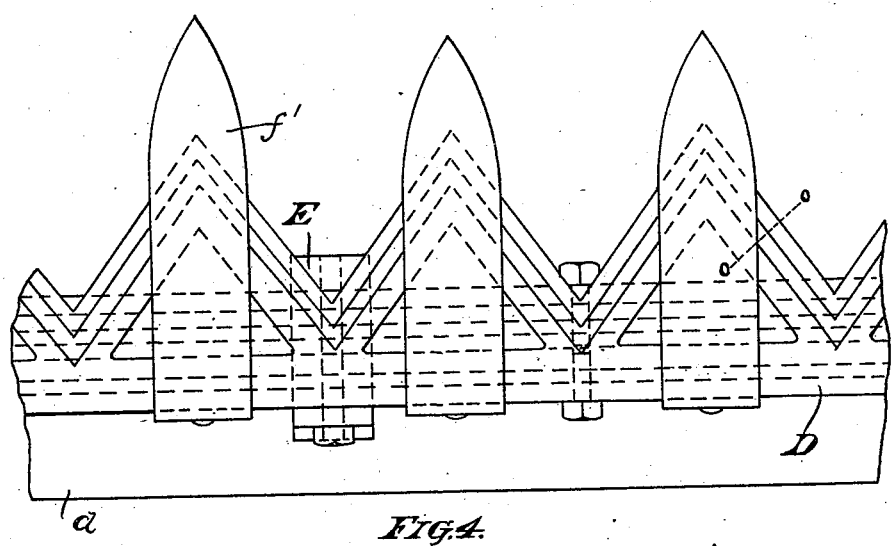
Figure 5:
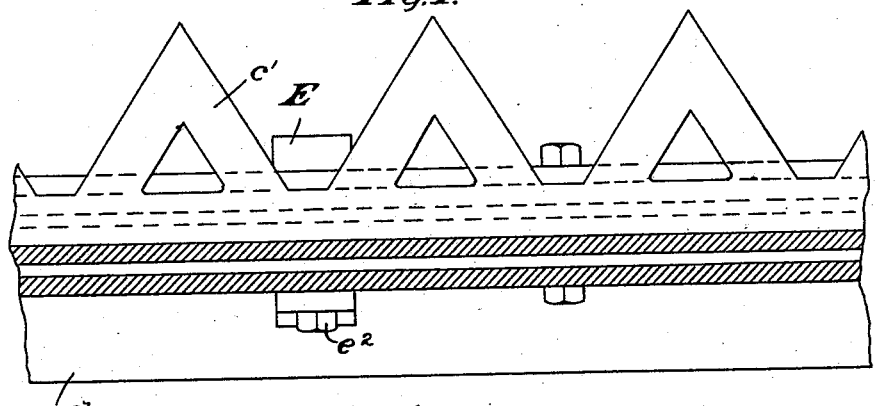
Figures 6, 7:
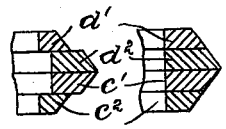
Figure 8:
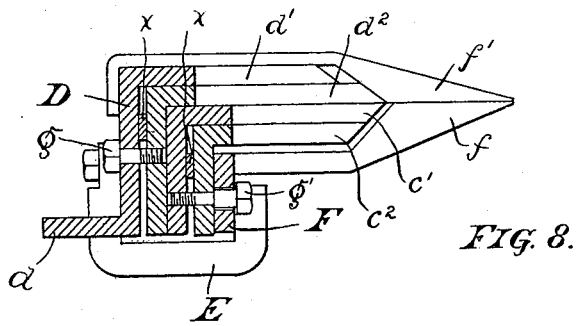

Figure 1 is a plan of a mower with my cutter-bar and driving mechanism attached; Fig. 2, a cross-sectional elevation of the cutter-bar, taken through the points of the teeth; Fig. 3, a partial front elevation, and Fig. 4 a partial plan; Fig. 5, a plan of the cutter-blade in detail, and Figs. 6 and 7 sections of the teeth, Fig. 6 showing the adjustment when a thin blade is desired. Fig. 8 is an enlarged section of the cutter-bar, taken on line 1 1 of Fig. 9; and Fig. 9 is an enlarged partial front elevation of the cutter-bar, showing the roller-slots.

I provide a sheave A attached to the main axle and having a wire-rope connection to the sheave B and operating to drive the latter sheave on its shaft $b$. This shaft is connected to the cutter-blade $c$ by mechanism suitable to give the blade a reciprocating motion as the sheave revolves.

The cutter-blade is composed of two angle-plates $c'$ and $c^2$, each provided with suitable teeth, the upper teeth forming the cutting edge, which plays across the guard-plate D, and of these teeth the upper set only are hardened and both sets are cut out in the center to lighten them. The lower angle-plate $c^2$ is so constructed that when adjusted as shown in the drawings, Fig. 4, the bevel given the cutting edge of the upper angle-plate $c'$ is continued in the lower angle-plate $c^2$, making practically one tooth of the thickness of the two plates. By adjusting the lower plate horizontally in toward the upper plate the bevel of the two appears as shown in section in Fig. 6, the cutting being practically performed by a plate of one-half the thickness of before. This adjustment is accomplished by using thin strips or separators $x$ $x$ of different thicknesses, according to the adjustment required. Suitable tap-bolts $g$ and $g'$ are provided to make this adjustment, one set, $g'$, adapted to bind the plates $c'$ and $c^2$ together and the other set, $g$, to bind the plates $d'$ and $d^2$ together. By unscrewing these bolts one set of separators may be taken out and another set of different thickness substituted and the bolts are then tightened. The guard-plate D is also composed of two angle-plates $d'$ and $d^2$, similarly constructed to those of the cutter-blade and capable of a similar adjustment. This guard-plate has an additional plate, $d$, to strengthen the bar.

Figure 9:
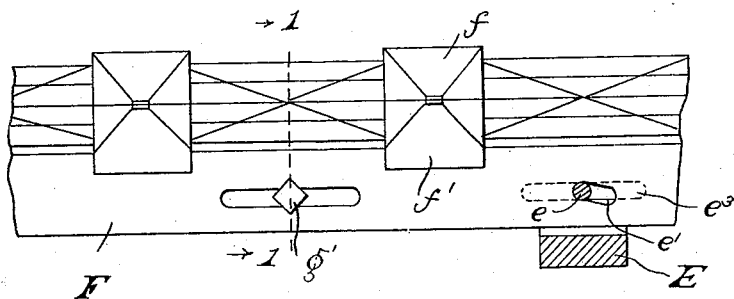

To carry the cutter-blade, I provide rollers $e$, operating in the bracket E, and the plates $c'$ and $c^2$ are provided with horizontal slots $e^3$, Fig. 9, sufficiently long to allow for the travel of these plates on the rollers $e$.

In front of the cutter-blade I place a bar or plate F to protect the blade, and this plate has projecting spurs *f*, adapted to form the lower half of the finger-guards, the upper half of which is formed of the spurs *f'*, which are riveted to the guard-plate *d'* and the two halves fastened together in any suitable manner.

The rollers *e* ride in slots *e'* of the plates F and *d'* and are carried by the bracket E. These slots are cut slightly on an incline, so that by loosening the nut $e^2$, which binds the bracket to the guard-plate *d'*, the bracket may be moved lengthwise of the bar one way or the other, acting to raise or lower the cutter-blade, as is required.

Thus it will be seen that the advantages of my improvement are a cutter-blade that has sufficient strength for all requirements both horizontally and vertically, a cutting-blade and a guard-plate that vary in thickness according to the size of the material to be cut, a cutting-blade that is capable of slight adjustment away from the face of the guard-plate when desirable for heavy or thick material, and a cutting-blade that can be operated with much less friction.

While I have described my invention with more or less completeness as regards the details thereof and as being embodied in more or less precise form, I do not desire to be limited thereto unduly, as I contemplate all proper changes of form, omission of parts, and the substitution of equivalents as circumstances may suggest or necessity render expedient.

I claim—

1. In a cutter-bar for mowers, the combination of a guard-plate of angular cross-section, and composed of two angle-plates provided with teeth on the horizontal portion of such angles, each tooth of the upper angle-plate arranged vertically above a corresponding tooth of the lower angle-plate and the teeth of one angle-plate capable of horizontal adjustment so as to project beyond the teeth of the other angle-plate or to be flush with it as is desired, a cutter-blade of angular cross-section and composed of two angle-plates constructed in the same manner as those of the guard-plate, and adapted to have a reciprocating motion with reference to the teeth of said guard-plate, substantially as described.

2. In a cutter-bar for mowers, the combination of a guard-plate of angular cross-section, and composed of two angle-plates provided with teeth on the horizontal portion of such angles, each tooth of the upper angle-plate arranged vertically above a corresponding tooth of the lower angle-plate and the teeth of one angle-plate capable of horizontal adjustment so as to project beyond the teeth of the other angle-plate or to be flush with it as is desired, a cutter-blade of angular cross-section and composed of two angle-plates constructed in the same manner as those of the guard-plate, and adapted to have a reciprocating motion with reference to the teeth of said guard-plate, a plate in front of and adapted to protect said cutter-blade, rollers adapted to carry said cutter-blades, and brackets arranged to carry said rollers, substantially as described.

3. In a cutter-bar for mowers, the combination of a guard-plate of angular cross-section, and composed of two angle-plates provided with teeth on the horizontal portion of such angles, each tooth of the upper angle-plate arranged vertically above a corresponding tooth of the lower angle-plate and the teeth of one angle-plate capable of horizontal adjustment so as to project beyond the teeth of the other angle-plate or to be flush with it as is desired, a cutter-blade of angular cross-section and composed of two angle-plates constructed in the same manner as those of the guard-plate, and adapted to have a reciprocating motion with reference to the teeth of said guard-plate, a plate in front of and adapted to protect said cutter-blade, rollers adapted to carry said cutter-blades, and brackets arranged to carry said rollers, and capable of vertical adjustment and finger-guards adapted to protect the points of said teeth, substantially as described.

4. In a cutter-bar for mowers, the combination of a guard-plate of angular cross-section, and composed of two angle-plates provided with teeth on the horizontal portion of such angles, each tooth of the upper angle-plate arranged vertically above a corresponding tooth of the lower angle-plate and the teeth of one angle-plate capable of horizontal adjustment so as to project beyond the teeth of the other angle-plate or to be flush with it as is desired, a cutter-blade of angular cross-section and composed of two angle-plates constructed in the same manner as those of the guard-plate, and adapted to have a reciprocating motion with reference to the teeth of said guard-plate, a plate in front of and adapted to protect said cutter-blade, rollers adapted to carry said cutter-blades, and brackets arranged to carry said rollers, and capable of vertical adjustment by means of inclined slots in the front and rear guard-plates and finger-bars adapted to protect the points of each set of teeth and joined to the front and rear guard-plate substantially as described.

5. In a cutter-bar for mowers, the combination of a guard-plate of angular cross-section, and composed of two angle-plates provided with teeth on the horizontal portion of such angles, each tooth of the upper angle-plate arranged vertically above a corresponding tooth of the lower angle-plate and the teeth of one angle-plate capable of horizontal adjustment so as to project beyond the teeth of the other angle-plate or to be flush with it as is desired, a cutter-blade of angular cross-section and composed of two angle-plates constructed in the same manner as those of the guard-plate, and adapted to have a reciprocating motion with reference to the teeth of said guard-plate, a plate in front of and adapted to protect said cutter-blade, rollers adapted to carry said cutter-blades, and brackets arranged to carry said rollers, a driving-sheave on the main axle of the mower provided with connections to a sheave adapted to operate a vertical shaft, such vertical shaft provided with a crank-arm and a connecting-rod adapted to be fastened to the cutter-blade, substantially as described.

ADOLPH PFUND.

Witnesses:
DELLA BALCH,
HENRY F. NOYES.